Patented Mar. 19, 1929.

1,705,817

UNITED STATES PATENT OFFICE.

GEORG KALISCHER, OF FRANKFORT-ON-THE-MAIN, AND WERNER ZERWECK, OF FECHENHEIM, NEAR FRANKFORT-ON-THE-MAIN, GERMANY, ASSIGNORS TO GRASSELLI DYESTUFF CORPORATION, OF NEW YORK, N. Y., A CORPORATION OF DELAWARE.

VAT DYESTUFFS AND PROCESS OF MAKING SAME.

No Drawing. Application filed July 8, 1926, Serial No. 121,283, and in Germany July 20, 1925.

We have found that new and very valuable vat dyestuffs are obtained by treating with acid condensing agents at moderate conditions the 1.1'-dinaphthyl-8.8'-dicarboxylic acid and its substitution products of the general formula:

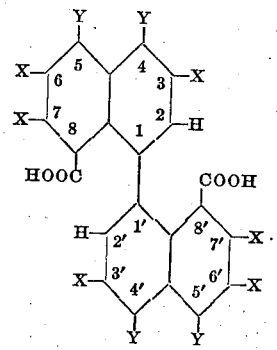

(wherein the X's stand for hydrogen atoms, of which one or more may be replaced by a monovalent substituent, the Y's stand for hydrogen atoms, which may be replaced by halogens), then heating with alkaline condensing agents the benzobenzanthrone-carboxylic acids thus obtained and finally subjecting to the action of acid condensing agents the condensation products thus obtained.

The new intermediate products formed in the different phases of the process have probably the following general formulæ:

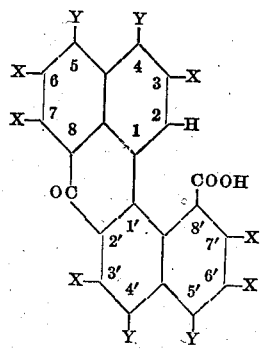

(wherein the X's stand for hydrogen atoms, of which one or more may be replaced by a monovalent substituent, the Y's stand for hydrogen atoms, which may be replaced by halogens) and

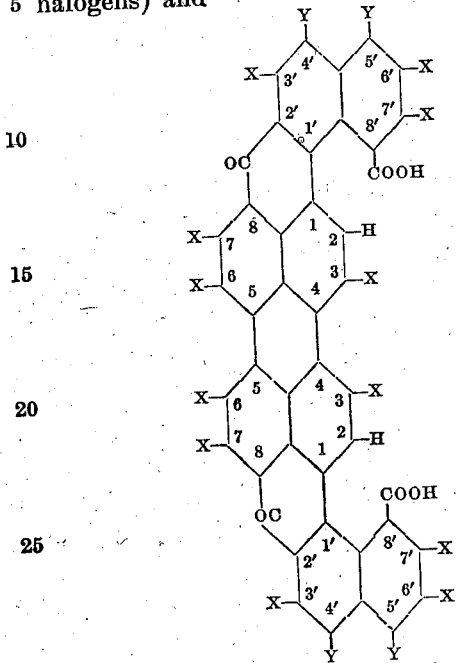

(wherein the X's stand for hydrogen atoms, of which one or more may be replaced by a monovalent substituent; the Y's stand for hydrogen atoms, which may be replaced by halogens) while the final products have probably the following formula which corresponds to the "violanthron" type:

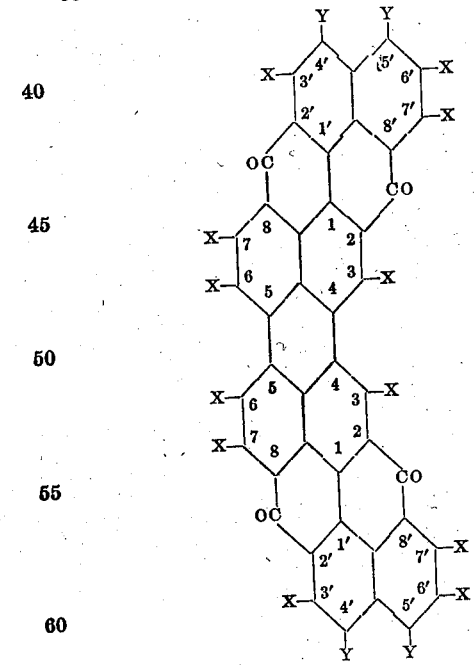

(wherein the X's stand for hydrogen atoms, of which one or more may be replaced by a monovalent substituent; the Y's stand for hydrogen atoms, which may be replaced by halogens).

The vat dyestuffs obtained by this process are insoluble in water, alkalies and in the usual organic solvents, soluble in concentrated sulfuric acid with a yellow to olive color, forming with alkaline hydrosulfite blackish violet colored vats from which cotton is dyed blue to gray shades, fast to washing, chlorine and light.

The 1.1'-dinaphthyl-8.8'-dicarboxylic acid as the starting material is obtainable for instance by saponifying its diethylic ester, which Kalb (see Berichte der deutschen Chemischen Gesellschaft, vol. 47, page 1724) has prepared by treating 1-chloro-8-naphthoic esters with copper powder.

The nuclear substitution products of the 1.1'-dinaphthyl-8.8'-dicarboxylic acid may be obtained either by saponifying the corresponding esters, which are described in the German Patent No. 280787, for instance by heating them with alcoholic hydrochloric acid for alcoholic alkalies, or by substituting directly the 1.1'-dinaphthyl-8.8'-dicarboxylic acid itself. It yields, when brominated in glacial acetic acid, a monobromoproduct, crystallizing from trichlorobenzene in yellow crystals and melting above 300° C., when treated with an excess of bromine in the cold an orange colored dibromocompound, melting above 300° C. and soluble in sulfuric acid of 80 p. c. strength to an olive solution, while the solution of the monobromoproduct is orange colored.

In order to further illustrate our invention the following examples are given; we wish it however understood that we are not limited to the particular examples given nor to the specific conditions mentioned. The parts are by weight and all temperatures in centigrades.

*Example 1.*

10 parts of the 1.1'-dinaphthyl-8.8'-dicarboxylic acid are boiled under reflux while stirring with 200 parts of glacial acetic acid and 20 parts of anhydrous zinc chloride, until the starting material is dissolved. After diluting the solution with water the benzo-benzanthrone-carboxylic acid, thus formed, separates.

The new compound crystallizes from a mixture of glacial acetic acid and alcohol in yellow prisms, melting at 278°, and is easily soluble in alkalies with a yellow color and in cold concentrated sufuric acid with a brownish red color.

*Example 2.*

Into a suspension of 10 parts of the 1.1'-dinaphthyl-8.8'-dicarboxylic acid in 48 parts of sulfuric acid of 48 p. c. strength 230 parts of sulfuric acid of 66° Bé. are allowed to run while stirring at about 60°. After some time the mass is worked up by introducing it in water, as described in Example 1. The benzobenzanthrone-carboxylic acid, thus formed, may be purified by dissolving it in alkalies, filtering the solution and precipitating with acids.

Analogous products are obtained by subjecting derivatives and substitution products of the 1.1'-dinaphthyl-8.8'-dicarboxylic acid to the same process.

For instance by starting from a monobromo - 1.1' - dinaphthyl - 8.8'-dicarboxylic acid the corresponding monobromobenzobenzanthrone-carboxylic acid is obtained, crystallizing from trichlorobenzene in yellowish orange needles, melting at 288–290°. It is soluble in sulfuric acid of 80 p. c. strength with a red color.

The dibromodinaphthyldicarboxylic acid yields, when treated in an analogous manner, a dibromobenzobenzanthrone-carboxylic acid, crystallizing from trichlorobenzene in orange colored crystals, melting above 300° and difficultly soluble in cold sulfuric acid of 80 p. c. strength with an olive color.

The monochlorodinaphthyldicarboxylic acid forms a monochlorobenzobenzanthrone-carboxylic acid, melting at 268–269°, when crystallized from monochlorobenzene, corresponding in its properties to the monobromocompound.

*Example 3.*

At about 95° 10 parts of the benzobenzanthrone-carboxylic acid, described in Example 1, are introduced into a mixture of 100 parts of caustic potash and 60 parts of alcohol. The temperature of the mass is maintained for some hours. Then the mass is dissolved in water and the solution is treated with air or another suitable oxidizing agent in order to oxidize the formed leucocompound of the condensation product. From the blue solution, thus obtained, the condensation product is isolated in the usual manner either by precipitating with acids or by adding common salt to the solution. The new carboxylic acid is when dry a blue powder, easily soluble even in a diluted solution of carbonate of soda. The solution in cold concentrated sulfuric acid is green colored, turning to olive, when warmed. With an alkaline hydrosulfite solution a blue solution is obtained, having a red fluorescence.

By using derivatives or substitution products of the benzobenzanthrone-carboxylic acid analogous condensation products of similar properties are obtained.

*Example 4.*

10 parts of the benzobenzanthrone-carboxylic acid and 20 parts of pulverized caustic potash are boiled for about 6 hours under reflux with 120 parts of pyridine, while stirring. After diluting the mass with water the pyridine is expelled by steam and the alkaline solution is worked up, as described in Example 3.

The compound, thus obtained, is identical with the product prepared according to Example 3.

By using other solvents or diluents such as aniline, dimethylaniline, naphthalene, the same result is obtained. Also the caustic potash may be replaced by other alkaline condensing agents, such as aniline-sodium, sodium-amide, sodium alcoholate.

*Example 5.*

10 parts of the product, described in Example 3, are introduced in 200 parts of sulfuric acid of 66° Bé. The solution is stirred at an ordinary temperature, until a sample, precipitated with water, is no longer soluble in alkalies. The reaction may be accelerated by warming the solution. The mass is then diluted with water and the separated dyestuff is filtered, washed and dried. Impurities may be removed by carefully treating it with a warmed diluted alkaline solution of hydrosulfite. The purified dyestuff, having probably the formula:

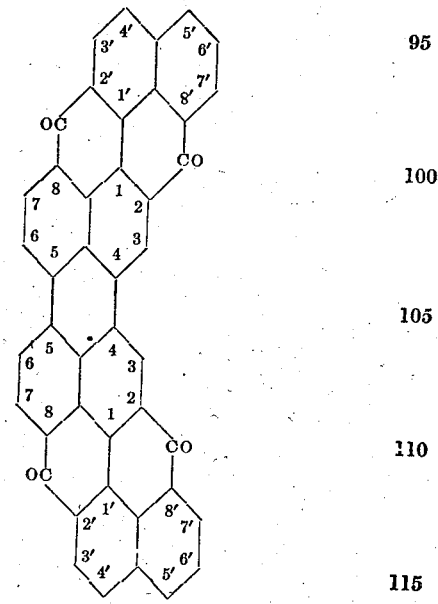

is when dry a bluish black powder, insoluble in the usual organic solvents, soluble in concentrated sulfuric acid to a yellowish olive solution. It forms with an alkaline solution of hydrosulfite a black-violet vat, from which cotton is dyed the same shade, turning to a greyish green blue of an excellent fastness, when the dyed goods are allowed to drain or are soaped.

By using for the process instead of the product, described in Example 3, its derivatives or substitution products, analogous dyestuffs of similar properties are obtained. For instance by starting from a bromobenzobenzanthron-carboxylic acid a dyestuff is obtained dyeing cotton from the vat bluish shades, by starting from a chlorobenzobenzanthroncarboxylic acid a grey dyeing dyestuff is obtainable in the same way.

We claim:

1. As new products vat dyestuffs, having probably the general formula:

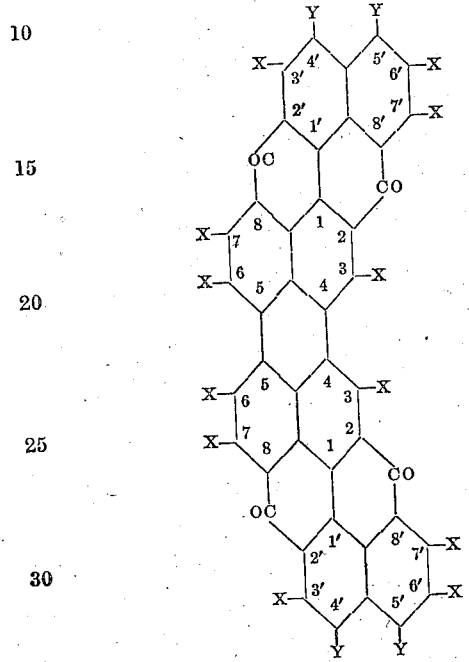

(wherein the X's stand for hydrogen atoms, of which one or more may be replaced by a monovalent substituent the Y's stand for hydrogen atoms, which may be replaced by halogens) which dyestuffs have a great affinity to the vegetable fiber, being when dry dark powders, insoluble in water, alkalies, and in the usual organic solvents, soluble in concentrated sulfuric acid to a yellow to olive solution and yielding with an alkaline hydrosulfite solution a blackish violet vat, from which cotton is dyed blue to gray shades fast to washing, chlorine and light, which dyestuffs are substantially identical with the dyestuffs obtainable by treating 1.1'-dinaphthyl-8.8'-dicarboxylic acids of the general formula:

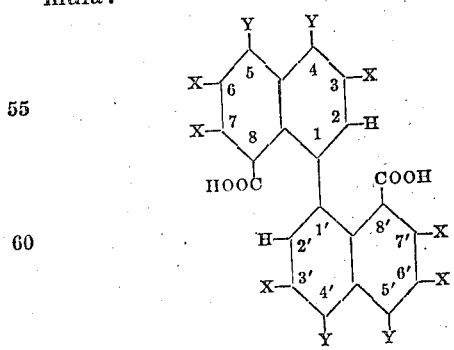

(wherein the X's stand for hydrogen atoms, of which one or more may be replaced by a monovalent substituent, the Y's stand for hydrogen atoms, which may be replaced by halogens) with acid condensing agents at moderate conditions by treating then the products of condensation with alkaline condensing agents and by subjecting finally to the action of acid condensing agents the products of condensation thus obtained.

2. A new process of making new vat dyestuffs by treating 1.1'-dinaphthyl-8.8'-dicarboxylic acids of the general formula:

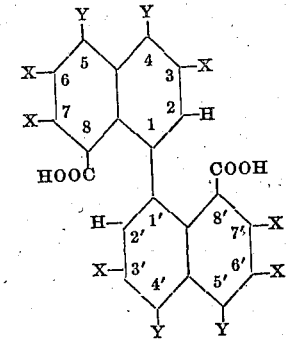

(wherein the X's stand for hydrogen atoms, of which one or more may be replaced by a monovalent substituent, the Y's stand for hydrogen atoms, which may be replaced by halogens) with acid condensing agents at moderate conditions, by treating then the products of condensation with alkaline condensing agents and by subjecting finally to the action of acid condensing agents the products of condensation thus obtained.

3. A new process of making new vat dyestuffs by treating benzo-benzanthrone-carboxylic acids of the general formula:

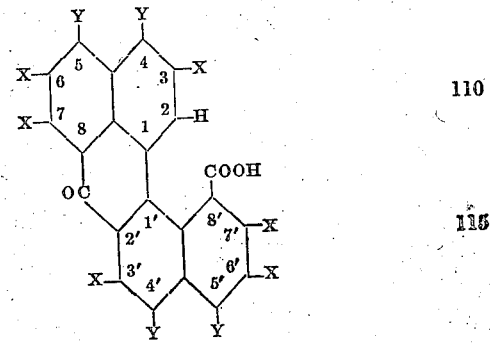

(wherein the X's stand for hydrogen atoms, of which one or more may be replaced by a monovalent substituent, the Y's stand for hydrogen atoms, which may be replaced by halogens) with alkaline condensing agents and by subjecting to the action of acid condensing agents the products of condensation thus obtained.

4. A new process of making new vat dyestuffs by subjecting alkali soluble carboxylic acids, having probably the general formula:

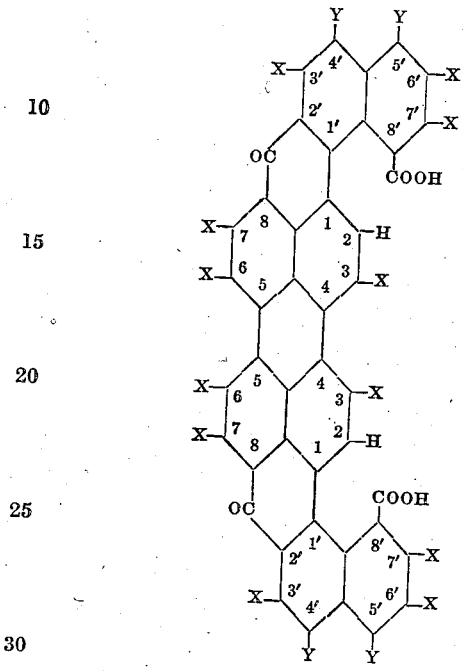

(wherein the X's stand for hydrogen atoms, of which one or more may be replaced by a monovalent substituent, the Y's stand for hydrogen atoms, which may be replaced by halogens) to the action of acid condensing agents.

5. As a new product the vat dyestuff, having probably the formula:

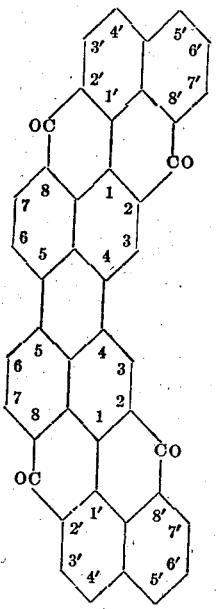

which dyestuff has a great affinity to the vegetable fibre, being when dry a bluish black powder, insoluble in water, alkalies and the usual organic solvents, soluble in concentrated sulfuric acid to a yellowish olive solution and yielding with an alkaline hydrosulfite solution a black-violet vat, from which cotton is dyed the same shade turning to green-blue; when the goods are allowed to drain or soaped, which dyestuff is substantially identical with the dyestuff obtainable by treating the 1.1'-dinaphthyl-8.8'-dicarboxylic acid of the formula:

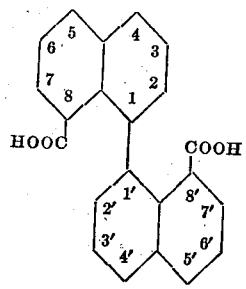

with an acid condensing agent at moderate conditions, by treating then the product of condensation thus obtained with an alkaline condensing agent and in subjecting finally to the action of an acid condensing agent the product of condensation thus obtained.

6. A new process of producing a new vat dyestuff by treating the 1.1'-dinaphthyl-8.8'-dicarboxylic acid of the formula:

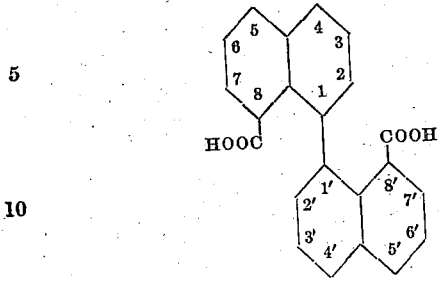

with an acid condensing agent at moderate conditions by treating then the product of condensation with an alkaline condensing agent and in subjecting finally to the action of an acid condensing agent the product of condensation thus obtained.

7. A new process of making a new vat dyestuff by treating a benzo-benzanthrone-carboxylic acid of the probable formula:

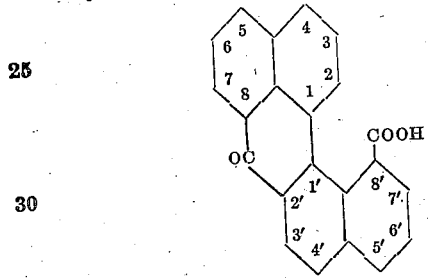

with an alkaline condensing agent and by subjecting to the action of an acid condensing agent the product of condensation thus obtained.

8. A new process of making a new vat dyestuff by subjecting a carboxylic acid of the probable formula:

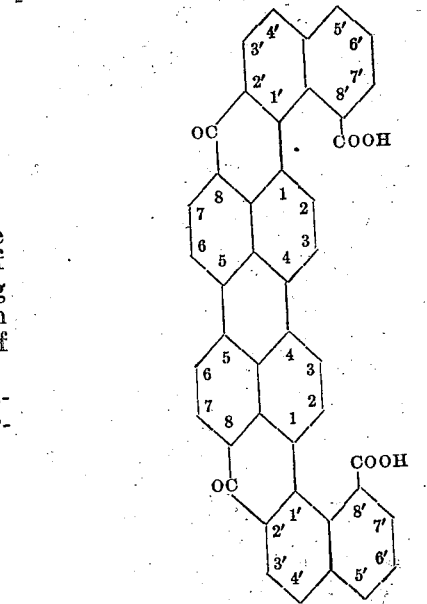

to the action of an acid condensing agent.

In testimony whereof, we affix our signatures.

GEORG KALISCHER.
WERNER ZERWECK.